E. C. BRUEN.
VEHICLE TIRE.
APPLICATION FILED MAR. 8, 1909.

987,668.

Patented Mar. 21, 1911.

987,668. VEHICLE-TIRE. EDWIN C. BRUEN, Brooklyn, N. Y. Filed Mar. 8, 1906. Serial No. 304,911.

*To all whom it may concern:*

Be it known that I, EDWIN C. BRUEN, a citizen of the United States, and a resident of Brooklyn, in the county of Kings and State of New York, have invented certain new and useful Improvements in Vehicle-Tires, of which the following is a specification.

My invention relates to certain improvements in vehicle tires, and it consists of certain novel parts and combinations of novel parts as hereinafter described and particularly pointed out in the claim concluding this specification.

Figure 1:
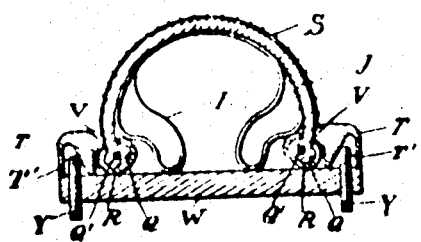
Figure 2:
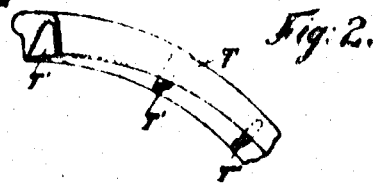

In the accompanying drawing illustrating my invention in both figures of which like parts are designated by similar numerals of reference, Figure 1, is a cross-section of the felly, tire and appurtenant parts embodying my improvements and, Fig. 2, is a detail view of the clencher ring shown in Fig. 1.

The principal feature of my invention consists in the combination with the tire shoe of an angularly convoluted spring, and adjustable means for laterally compressing said spring and maintaining it under tension whereby all the practical advantages of a pneumatic tire may be obtained without any of its disadvantages.

Referring to the drawing I, designates an angularly convoluted compressed spring, confined within a tire shoe J, of leather, rubber or other suitable material, preferably provided with enlarged edges Q, having a wire core Q', and a protecting binder R, composed of thin sheet metal bent around the edges Q, and tightly pressed in position; this tire shoe may be inclosed in an outer shoe S, composed of woven wire fabric, preferably a closely woven light, strong flexible wire such as piano wire, for instance, and this wire shoe will serve the useful purpose of preventing the wheel from skidding or sliding in use.

As shown in Fig. 1, the shoe J, with the spring I confined therein is mounted on the wheel rim and secured in place by an adjustable clencher device which comprises a ring T, having a series of beveled recesses T', and an inwardly projecting portion V, to fit over the binder R, and bear against the tire shoe J. To secure the shoe to the wheel-rim W, I employ adjusting screws Y, which pass through the rim W, and bear against the inner beveled edges of the recesses T', these screws operating as they are screwed up to compress the edges of the shoe inwardly and at the same time compress the angularly convoluted spring I, by lateral pressure. These screws may be adjusted from time to time whenever necessary. It is obvious, however, that instead of the construction described any suitable form of adjustable clencher ring may be employed.

It will be seen that the angularly convoluted compressed spring I, confined within the tire shoe J, constitutes a flexible resilient resisting medium to the outward pressure on the tread of the wheel and at the same time keeps the shoe distended and solid so that it is able to bear the weight of the vehicle and the strain of use under all the varying road conditions.

A tire embodying my improvement cannot be rendered inefficient by punctures, will be light, strong and durable and can be readily repaired.

What I claim as my invention and desire to secure by Letters Patent is:

In a tire for vehicles the combination with a flexible tire shoe of an angularly convoluted spring and adjustable means for laterally compressing said spring within the shoe and securing said tire to the rim or felly, substantially as described.

Signed at New York city in the county of New York and State of New York this 7th day of March A. D. 1906.

EDWIN C. BRUEN.

Witnesses:
BENJ. BRUEN,
WM. CHAMBRECHT.